United States Patent [19]
Einola

[11] Patent Number: 5,960,354
[45] Date of Patent: Sep. 28, 1999

[54] MULTIBAND MOBILE TELEPHONE SYSTEM

[75] Inventor: Heikki Einola, Helsinki, Finland

[73] Assignee: Nokia Telecommunications Oy, Espoo, Finland

[21] Appl. No.: 08/776,279
[22] PCT Filed: May 15, 1996
[86] PCT No.: PCT/FI96/00272
§ 371 Date: Jan. 14, 1997
§ 102(e) Date: Jan. 14, 1997
[87] PCT Pub. No.: WO96/37084
PCT Pub. Date: Nov. 21, 1996

[30] Foreign Application Priority Data

May 16, 1995 [FI] Finland .................................. 952382

[51] Int. Cl.[6] ...................................................... H04B 7/26
[52] U.S. Cl. ........................... 455/454; 455/451; 455/452; 455/62
[58] Field of Search ...................................... 455/422, 436, 455/437, 443, 444, 450, 451, 452, 454, 455, 67.1, 62, 63; 370/329, 331, 332

[56] References Cited

U.S. PATENT DOCUMENTS 5,373,547  12/1994  Patsiokas et al. .
5,428,816  6/1995   Barnett et al. .
5,666,650  9/1997   Turcotte .................................. 455/422

FOREIGN PATENT DOCUMENTS

93/19538  9/1993  WIPO .
94/05130  3/1994  WIPO .

OTHER PUBLICATIONS

Patent Abstract of Japan, JP 7038943 A (NTT Idou Tsuushinmou KK), Feb. 7, 1995.

*Primary Examiner*—Thanh Cong Le
*Attorney, Agent, or Firm*—Pillsbury Madison & Sutro LLP

[57] ABSTRACT

A cellular mobile telephone system is provided. The system operates on frequency bands each of which comprises a respective total number of sub-bands. Each sub-band has a different respective frequency. The system includes a network of base stations, and mobile stations. The mobile stations comprise a given mobile station communicating with the network on a sub-band within a current operational frequency band comprising one of the operational frequency bands. The network transmits to the given mobile station certain information regarding designated sub-bands for which the given mobile station is to perform measurements. The certain information comprises a minimum number of alternate sub-bands of an alternate operational frequency band other than the current operational frequency band. The given mobile station receives from the network the certain information and transmits to the network a measurement report comprising measurement results for a number of alternate sub-bands equal to at least the minimum number but less than the total number of alternate sub-bands.

23 Claims, 1 Drawing Sheet

```
RR MANAGEMENT
PROTOCOL DISCRIMINATOR
NUMBER OF FREQUENCIES
TO BE REPORTED
SYSTEM INFORMATION
TYPE 5ter MESSAGE TYPE
EXTENSION OF THE BCCH
FREQUENCY LIST
DESCRIPTION
```

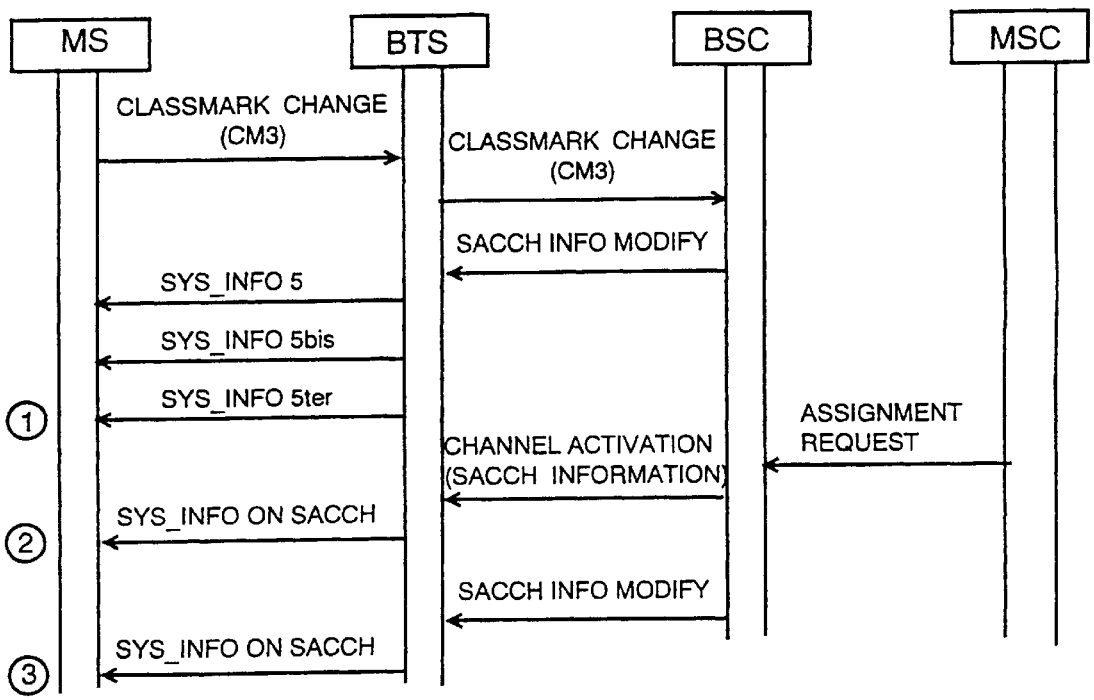

MULTIBAND MOBILE TELEPHONE SYSTEM

This application is the national phase of international application PCT/FI96/00272, filed May 15, 1996 which designated the U.S.

SUMMARY OF THE INVENTION

1. Field of the Invention

The invention relates to a cellular mobile telephone network with at least two frequency bands and in which at least some mobile stations may use whichever frequency band for communication, and in which the control channel associated with a traffic channel may be dedicated so that the network may send control information individually to the mobile station.

2. Background Information

According to the standard, e.g., a frequency band in a GSM mobile communications network comprises two sub-bands 25 MHz wide each, with frequency ranges 890–915 MHz in the uplink direction, i.e., from the mobile station to the base station, and 935–960 MHz in the downlink direction, i.e., from the base station to the mobile station. While the GSM network specification was being drawn up, another band with a higher frequency was also included therein. It comprises 75 MHz sub-bands, with a frequency range 1710–1785 MHz in the uplink direction and 1805–1880 MHz in the downlink direction. The system operating in the 1800 MHz frequency range is called the DCS system (DCS, Digital Cellular System) and its specification is a part of the GSM specification. Propagation properties of radio waves of the bands are different: on DCS frequencies free space attenuation is greater than on GSM frequencies. A natural cause of this is that GSM frequencies are well suited for covering an extensive cell, whereas DCS frequencies are suited for covering small cells.

Except for the frequency differences, the systems are essentially similar, e.g. the air interface is the same. Even at present, the GSM network is in some countries, especially in urban areas with high traffic density, on the upper limits of its capacity, and hence the GSM band frequencies available to the operator are no longer sufficient to ensure service to all subscribers. Channel capacity has been increased by spreading the frequency band, so-called extended-GSM, but decisively more capacity will be obtained by taking into use another frequency band, i.e., transfer to multiband operation. This provides additional capacity to sites with high traffic density where the GSM band frequencies available to the operator no longer suffice to ensure service to all subscribers.

Both GSM and DCS frequency bands may be used either in separate networks or as a combined network under common network control. In the latter case, mobile stations able to operate on both frequency bands may be used. Such mobile stations are called multiband mobile terminals. Multiband mobile terminals are of two types.

A mobile terminal of the first type meets the requirements specified for both bands and may thus operate, e.g., on either a GSM or a DCS band by registering into the respective network. This type of mobile station does not, however, support handover between bands of operation, channel assignment, cell selection or cell re-selection between the bands of operation. The mobile station does not therefore require any network support to work on more than one band, and it uses the channels of that particular band only.

A mobile terminal of the second type continuously uses the channels of both bands, and hence not only meets the requirements specified for both bands, but some additional requirements, too. The additional features compared with a mobile station of the first type are that it is able to perform handover, channel assignment, cell selection and cell re-selection between the bands of operation. Thus, the network has to support these operations.

In this application a case will be described where the network supports mobile stations of the second type, i.e., telephones that are able to operate on both bands. The coverage areas of both GSM and DCS networks are at least partially overlapping.

A feature typical of a multiband mobile terminal of the second type, later referred to as a multiband mobile station, is the above mentioned capability for handover from a frequency band to another. A criterion for handover may be better audibility on a channel of another band or the tendency of the network to decrease the traffic load on a certain band. In order to be able to perform handover well, a multiband mobile station must be able to also measure frequencies of an adjacent band and send the measurement results to the network.

According to the GSM specification, a traffic channel TCH, which may be full rate TCH/F, half rate TCH/H or still slower TCH/8, is always assigned together with a slow associated control channel SACCH. In accordance with GSM terminology, a slow TCH/8 channel with its associated SACCH channel is called an SDCCH channel (Standalone Dedicated Control Channel). The control channel is in a way "inside" the traffic channel: e.g. the multiframe of a full rate traffic channel comprises timeslots of the same timeslot number of 26 successive frames. A cycle of 26 timeslots comprises 24 timeslots in which a TCH burst (a speech burst) is sent, one timeslot in which an SACCH burst is sent, and one timeslot in which nothing is sent. A mobile station uses the slow SACCH control channel to transmit various measurement results to the base station. The base station sends commands associated with power control and timing advance on the control channel to the mobile station. In addition, the base station sends general information associated with the network, so-called system_info messages, e.g. system_info 5 and 5bis. This information contains a list of adjacent cell frequencies to be monitored, a base station identifier BSIC, BCCH frequency information, parameters associated with controlling a disturbance in a radio connection, etc. According to the present specification, system_infos 2/5 and 2bis/5bis inform a mobile station of the adjacent cell frequencies. The information is an index group, in which each index corresponds to a certain frequency. The index group also indicates to which band a frequency belongs, as the group may contain frequencies on both GSM and DCS bands. It should be noted that according to present technology, the system infos sent on the SACCH channel are TRX-specific, i.e. not call-specific, and the network may change the system infos TRX-specifically by an SACCH Filling message. An amendment specifying the transmission of SACCH System Info call-specifically has been suggested as a common enhancement to the present GSM specification 08.58.

The mobile station and the base station have to measure the strength of the received signal and, in addition, the mobile station must measure the strength of the BCCH carrier wave of the adjacent base stations given on the list of adjacent base stations to be monitored received from the network. According to the present GSM specification, the mobile station reports on the six adjacent cells having the best audibility. The quality of a received signal is measured by calculating the bit error ratio. A mobile station must report its measurement results to its own base station. In the GSM system it reports them on a slow control channel SACCH. If the SACCH channel is not used for any other purpose than reporting, the mobile station may report the measurement results twice a second. In the GSM system, a measuring and reporting cycle comprises four multiframes (1 multiframe equals 26 traffic frames), and so the results are transmitted at intervals of 480 ms.

The network uses the measurement results for the power control of not only its own transmitter but also that of the mobile station, for giving timing advance to the mobile station and for handover purposes. First, handover criteria include deterioration in the quality of the radio connection between the base station and the mobile station, indicated by an increasing bit error ratio, secondly, information received from the monitoring of the adjacent base stations stating that the radio path to a neighbour is better than that to the present base station, and thirdly, traffic load calculated by the network, indicating that it would be advantageous to transfer traffic to another base station from the presently extremely loaded base station.

The use of a combined network with a plurality of frequency ranges involves problems with frequency measuring that do not exist in single frequency band networks.

A special problem is associated with situations when within the range of audibility of at least two bands, only the frequencies of the current band of operation are better audible, or when the frequencies of an adjacent band are better audible than those of the current band of operation. Let us view the first case in the GSM and DCS systems as an example: When a multiband mobile station reports on the six strongest adjacent cells, the result may be that the base stations of all these adjacent cells send on frequencies of the same, current band of operation. If the network wishes to decrease the traffic load of a band by transferring the traffic of a mobile station to another band, handover between bands would be impossible in this case, as the network has no knowledge of the channels of the other band. Regarding the DCS band, this is not necessarily a major drawback as more frequencies are in use than on a GSM band. According to the above, the problem is that the network should always receive measurement results from both bands when the frequencies of the bands are audible.

As a solution to the problem it has been suggested that a mobile station would report on at least one frequency of the other band that it has measured, preferably the best audible frequency. However, it has not been proposed how the network could in every possible situation influence the number of frequencies to be reported of the other frequency band.

Another suggested solution, complementary to the above, is that the contents of the information messages system_ info 5 and 5bis, transmitted on the SACCH channel and known from the GSM network, are chosen so as to achieve a crude adjustment of the number of frequencies to be reported of the adjacent band. The network could, for example omit from the information messages the frequencies that are on the same band on which the mobile station is operating at that time. In this way, by using handover, the network could force the mobile station to move to another band. A drawback of this solution is that it does not allow flexible adjustment of the number of frequencies to be reported of the adjacent band, as upon giving the information message, the network cannot know which frequencies are best audible to the mobile station. Thus, the proposed solution is applicable to one special case only.

In addition, it must be considered that a sufficient number of frequencies from both bands might be placed for handover in the group of the six best audible frequencies reported by the mobile station according to the present specification. In this case no special measures are needed to gain frequency information from both bands. Such a situation is, however, a special case.

The international patent application PCT-94/05130 discloses a method of rearranging channels. The method is applied to a cellular system with two or more channel groups. The first channel group may include TDMA channels and the second channel group CDMA channels. A multi-mode telephone can operate in both systems. When setting up a call, the network determines the current capacity of both groups. A multi-mode telephone is assigned a traffic channel on the frequency of the group with the highest capacity. A multi-mode telephone operating on the frequency of another channel group may also be handed over from one group to another, i.e. handover is performed and thus free group frequencies for single-mode telephones. A mobile station may be handed over to a channel with the least interference or it may be handed over to a randomly chosen free channel in another group.

In accordance with this PCT application, the network performs all handover-associated operations. The application does not state which measurements the multi-mode mobile station may perform, or which operations are required thereof for successful handover.

The aim of this invention is a mobile communication system using two or more frequency ranges without the above drawbacks. A prerequisite for a mobile communications system to which the invention is applied is that call-specific control information can be sent. Thus the aim is a system that will allow reception of information needed for handover between bands from both bands, and especially a system that will allow a flexible change in the number of frequencies to be monitored during the connection. The system must allow flawless operation of mobile stations operating on one band and mobile stations operating on two bands but incapable of handover therebetween. Thus a favourable environment is the GSM system where the bands may be a 900 MHz range band and a 1800 MHz range band defined in the GSM specifications. The air interface conforms to the GSM system and call-specific SACCH information is sent as described in a proposal for an amendment to GSM specification 08.58.

This goal is achieved with the method of the invention, which is characterized in that the network informs the mobile station for at least one band outside the current band of operation of the minimum number of frequency measurement results that the mobile station should inform in the measurement report. The number data may also be absolute, so that the measurement report should contain exactly the number of frequencies given therein.

Having performed the measurements, the mobile station places in the measurement report a number of measurement results, given in the number data, for the frequencies with the highest audibility from at least one band outside the current band of operation. Measurement results for the frequencies with the highest audibility of the current band of operation are placed in the remaining space in the measurement report. If the measurement results of the current band of operation are fewer than the remaining space, more measurement results for frequencies outside the current band of operation are placed in the remaining space.

When the invention is applied to the GSM system, the network sends on a control channel SACCH associated with the traffic channel to the mobile station not only information on the frequencies of the other band to be monitored, but also call-specific information on how many monitored adjacent band frequencies the mobile station should report. Measurement results of the adjacent band frequencies have to be sent irrespective of how well the monitored frequencies are audible compared with the frequencies of the serving band. The telephone attempts to include in its measurement report a number of adjacent band frequencies given by the network. However, if the number of sufficiently well audible adjacent band frequencies is less than the number given by the network, fewer adjacent band frequencies may be included in the measurement report. The same is true if the frequencies of the serving band are not audible, in which case the telephone may include in the measurement report more adjacent band frequencies than the number given by the network.

The number of adjacent band frequencies to be reported is not constant, but the network may change it as needed. The number is affected by, e.g. the current traffic density of the network both on the serving and on the adjacent bands, time of day, or a corresponding quantity. The number also sets a limit on the minimum number of frequencies of the serving band to be reported when they are sufficiently audible.

BRIEF DESCRIPTION OF THE DRAWINGS

In the following the invention will be described in greater detail by means of a preferred embodiment of GSM/DSC multiband operation with reference to the accompanying drawings, in which FIG. 1 shows a simplified, known signalling diagram including data transmission in accordance with the invention, FIG. 2 shows the contents of a sys_info modify message and FIG. 3 shows the contents of a System_Info 5bis/ter message.

DETAILED DESCRIPTION

Let it be assumed that at the initial stage a mobile station is registered in a network and is idle. When the mobile station has been assigned a traffic channel, after it responded to a paging message (mobile terminated call) or requested a traffic channel (mobile originated call), a call-specific control channel SACCH for signalling is also connected with the assigned traffic channel TCH or SDCCH, as is described in a proposal for an amendment to GSM specification 08.58. The mobile station moves from idle mode to signalling on a call-specific control channel.

Reference is made to FIG. 1, showing known messages when a call-specific control channel is used. The mobile station informs the network of its ability to support multiband operation by sending e.g. a "Classmark Change" message. This known message includes information CM3 (Classmark Information 3) containing multiband information associated with the mobile station. Having received the above message, the base station controller BSC decides to send on a call-specific SACCH channel SACCH information tailored for this particular mobile station, by using an SACCH Info_Modify message known per se. The message contains a System_Info5 message to be sent to the mobile station, and System_Info5bis and System_Info5ter messages, which are sent optionally. System_Info5 is always sent on an SACCH channel, if needed, System_Info5bis, and System_Info5ter may additionally be sent to a multiband mobile station.

In accordance with the invention, it is advantageous to include in this System_Info5ter message, known per se, information about which adjacent band frequencies the mobile station has to monitor and how many frequencies have to be reported to the network. The message does not have to be sent if the location cell of the mobile station has no adjacent cells from another band. The message may also include frequencies from the current band of operation, but it is preferable to place the frequency monitoring information on this band in the messages System_Info5 or System_Info5bis.

The number data sent in the System_Info5ter message may alternatively be sent later. After the above System-Info messages have been sent, the mobile telephone exchange requires in a message 'Assignment Request' of the BSC (Base Station Controller) that it activates a radio channel and as a response to the message the base station controller sends a 'Channel Activation' message to the base station BTS. The information element 'SACCH Info' presented in the proposed amendments to the GSM specifications may be included in the activation message. If this element has been added to the message, the System_Info message in the element replaces the corresponding earlier message and it is used while the traffic channel is maintained. If the SACCH information needs to be changed during the communication, the known SACCH Info_Modify message is used. If needed, a list of the adjacent band frequencies to be monitored and the number of frequencies to be reported is changed in a System_Info5ter message included in this message.

According to the invention, data may be transmitted to a mobile station in at least three different ways, that is, in the stages shown in FIG. 1, presented by the circled numbers 1, 2 and 3.

In the above, functions associated with channel assignment have been presented. The SACCH channel may be tailored even after handover. In handovers controlled by the base station controller BSC, the same base station to whom the Assignment Request message was addressed also activates the new traffic channel and tailors the SACCH by means of e.g. a Channel Activation message or an SACCH Mode_Modify message. In handovers controlled by the mobile telephone exchange, a CM3 (Classmark Information 3) may be included in a 'Handover Request' message, known per se, which the mobile telephone exchange sends to the base station controller to whose control the mobile station is transferred. Thereafter the base station controller may include a SACCH_Info field in the Channel Activation message or it may activate the channel first and change the contents of SACCH by an SACCH Info_Modify message.

FIG. 2 shows the fields of a known dedicated SACCH_Info_Modify message. The fields 'message separator', 'signal type', 'channel number' and 'System Info type' are obligatory, whereas the field containing actual system_info and the field 'start time' are optional. The latter field states when the next data transmission starts and when it ends.

FIG. 3 shows the contents of a possible System_Information 5ter message with space for data transmission according to the invention. The message includes a field 'extended BCCH frequency list' and the list contains the indices of the frequencies that the mobile station has to monitor. The frequencies given in the list may be frequencies of both a GSM and a DCS band. The message also comprises a half octet long field 'number of frequencies of an adjacent band to be reported', where the bits controlling the reporting of the mobile station in a way described below are placed. This field replaces the field 'skip indicator' in the known 5ter message.

For example two bits may be used to present four alternatives: bits 00 state that among six frequencies to be reported must be 1 adjacent band frequency, bits 01 require that 2 adjacent band frequencies are reported, bits 10 require that three, and correspondingly bits 11 that four adjacent band frequencies are reported.

Let us assume as an example that a multiband mobile station has received on a dedicated channel in the field 'extended BCCH frequency list' of the SACCH message 'System_Information 5ter' a frequency list, e.g. 20 frequencies. Frequencies are from both the serving band and an adjacent band. Let us assume further that the assigned TCH channel belongs to a 900 MHz band in the GSM system and that indices 1–10 of the frequencies on the frequency list are frequencies of this band and frequency indices 101–110 are frequencies of a GSM 1800 MHz band (DCS band). The mobile station knows to which band each index belongs and which frequency corresponds to the index, so it is capable of measuring all given frequencies. Let us assume that the measured signal strengths are in the order from the strongest to the weakest:

1, 2, 3, 4, 5, 101, 6, 7, 8, 9, 10, 102, 103, 104, 105, 106, 107, 108, 109, 110.

In a prior art arrangement the mobile station would report on an uplink SACCH channel to the base station the six best audible frequencies, i.e. frequencies 1, 2, 3, 4, 5, 101, which all, except frequency 101, would be GSM band frequencies. Frequency information on an adjacent DCS band may be too scarce for handover between bands.

In accordance with the invention, the field 'number of adjacent band frequencies to be reported' in the system_info 5ter message contains information on the number of adjacent band frequencies that the mobile station has to report on. If the information given requires that a report be given on three adjacent band frequencies, the list of the six frequencies to be reported would be as follows:

1, 2, 3, 101, 102, 103.

This frequency information is sufficient for handover between bands.

Should the network wish to change the number of adjacent band frequencies to be reported during the communication, the base station has to send to the mobile station a new system_info 5ter message. For this purpose the base station controller sends to the base station a 'SACCH_Info_Modify' message, known per se, FIG. 1. In this message the base station controller notifies the base station that the information sent on the control channel is changed and more exactly, which System_Info messages have to be sent. The base station controller changes the 'System_Information 5ter' message to be sent so that the information on the number of adjacent band frequencies to be notified in the field 'number of adjacent band frequencies to be reported' is changed.

Said information may require that the mobile station report on, e.g. five adjacent band frequencies, in which case the list of frequencies to be reported would be 1, 101, 102, 103, 104, 105.

Having measured the strength of the frequencies notified and chosen the frequencies to be reported in a manner of the invention, the mobile station notifies them to the network in a measurement report sent on an uplink control channel SACCH in a known manner. The contents of the report are described in GSM specification 04.08.

In the described manner the network sends on a dedicated control channel SACCH modifiable information on how many adjacent band frequencies the mobile station has to report on. Because of the changeability, the number of adjacent band frequencies to be reported may be flexibly adjusted at all times, for example in a particular area according to traffic density, time of day or another quantity.

The described procedure is favourable as is does not limit the number of frequencies to be monitored, notified to the mobile station in the system_info 5, 5bis and 5ter messages, and therefore the mobile station independently chooses the frequencies with the best audibility at each moment from both bands. In this way the network receives information on both frequency bands and may transfer the mobile station to another band when needed.

In the above described case the information on the number of adjacent band frequencies to be reported is placed in an existing field of a System_Info message. A new field may equally well be added to the message for transmission of the number data. It is also possible to create a completely new System-Info type of message to be transmitted on the control channel to transmit the number data to the mobile station.

A requirement set on the network is the capability of performing handover between bands when needed on the basis of the reports from the mobile station even when the frequencies the other band are not the best audible, but are adequately audible. This places special requirements on the handover algorithm.

An advantage of the invention is that the system_info 5ter message and the therein included number of adjacent band frequencies to be reported is transmitted to a multiband mobile station only, and therefore the embodiment does not cause compatibility problems with mobile stations operating on one band.

In the preferred embodiment of the invention the radio system is a time division multiple access (TDMA) system. The invention may, however, be applied also in connection with any other multiple access method, such as code division multiple access (CDMA) or frequency division multiple access (FDMA).

The above description and the accompanying drawings have been presented by way of illustration only. It will be understood by those skilled in the art that various modifications and variations may be made to the present invention without departing from the scope and spirit thereof, which is defined by the appended claims.

I claim:

1. A cellular mobile telephone system comprising:

operational frequency bands, each of said operational frequency bands comprising a respective total number of sub-bands, each of said sub-bands having a different respective frequency;

a network of base stations; and mobile stations comprising a given mobile station communicating with said network on a sub-band within a current operational frequency band comprising one of said operational frequency bands;

said network transmitting to said given mobile station certain information regarding designated sub-bands for which said given mobile station is to perform measurements, said designated sub-bands including current sub-bands within said current operational frequency band and alternate sub-bands within an alternate operational frequency band different from said current operational frequency band, said certain information comprising number data comprising a minimum number of said alternate sub-bands; and said given mobile station receiving from said network said certain information and transmitting to said network a measurement report comprising measurement results for a reported number of sub-bands including a number of said alternate sub-bands equal to at least said minimum number but less than said total number of said alternate sub-bands.

2. The system according to claim 1, wherein said certain information comprises a precise number of said alternate sub-bands, and wherein said given mobile station transmits to said network a measurement report comprising measurement results for a number of said alternate sub-bands equal to said precise number.

3. The system according to claim 1, wherein said measurement report comprises measurement results for alternate sub-bands with the highest audibility and measurement results for current sub-bands with the highest audibility.

4. The system according to claim 3, wherein said measurement report comprises measurement results for a limited number of sub-bands comprising said current sub-bands and said alternate sub-bands, and wherein said limited number is allocated to said current sub-bands and to said alternate sub-bands so that if the reported number of said current sub-bands is reduced, the reported number of said alternate sub-bands is increased.

5. The system according to claim 1, wherein said minimum number of said alternate sub-bands may be changed.

6. The system according to claim 5, wherein during a communication between said given mobile station and said network, said network transmits a message changing said number data.

7. The system according to claim 6, wherein said certain information comprises a message comprising said number data, said message being transmitted on a dedicated control channel to said mobile station.

8. The system according to claim 1, wherein said certain information comprises a common message including said number data and a list of frequencies corresponding to said current sub-bands and said alternate sub-bands.

9. The system according to claim 1, wherein said certain information comprises one message including a list of frequencies corresponding to said current sub-bands and said alternate sub-bands and a separate message including said numbered data.

10. The system according to claim 9, wherein said operational frequency bands comprise a GSM and a DCS frequency band.

11. The system according to claim 10, wherein said network transmits to said given mobile station system information messages comprising said number data.

12. The system according to claim 1, wherein said system comprises a time division multiple access (TDMA) mobile telephone system.

13. A cellular mobile communications system comprising:
at least two operating frequency bands;
base stations;
mobile stations capable of operating on each one of said at least two frequency bands;
a serving one of said base stations being arranged to transmit at least certain information to a given mobile station communicating on a frequency of a current frequency band of said at least two frequency bands, said certain information comprising designated frequencies that said mobile station will measure within said at least two frequency bands, and a minimum number of frequencies to be reported from an alternate frequency band other than said current frequency band;
said given mobile station being arranged to measure said designated frequencies and to report measurement results for a predetermined number of the measured frequencies in a measurement report transmitted to said serving base station, said predetermined number being less than all of said measured frequencies, and said measurement report including measurement results for at least said minimum number of frequencies from said alternate frequency band.

14. The system according to claim 13, wherein said measurement report always comprises measurements for precisely said minimum number of frequencies from said alternate frequency band.

15. The system according to claim 14, wherein said base station is arranged to transmit said minimum number on a dedicated control channel associated with an on-going call of said given mobile station.

16. A cellular mobile communications system comprising:
a first operating frequency band having first frequencies;
a second operating frequency band having second frequencies;
base stations;
mobile stations capable of operating on each one of said first and second frequency bands;
a serving one of said base stations being arranged to transmit at least certain information to a given mobile station communicating on one of said first frequencies, said certain information comprising a list of designated frequencies that said given mobile station will measure within said first and second frequency bands, and a minimum number $N_{MIN}$ of said second frequencies to be reported from said second frequency band;
said given mobile station being arranged to measure said designated frequencies and to report measurement results for a predetermined number $N_1$ of said designated frequencies in a measurement report transmitted to said serving base station, said predetermined number $N_1$ being smaller than a number $N_2$ of said designated frequencies, and said measurement report including measurement results for at least said minimum number $N_{MIN}$ of said second frequencies and measurement results for not more than $N_1-N_{MIN}$ of said first frequencies.

17. The system according to claim 16, wherein said measurement report always includes a value representing said minimum number $N_{MIN}$ of said second frequencies.

18. The system according to claim 16, wherein said measurement report comprises said minimum number $N_{MIN}$ of said second frequencies having a highest measured signal strength in said second frequency band and measured results for $N_1-N_{MIN}$ of said first frequencies having a highest measured signal strength in said first frequency band.

19. The system according to claim 16, wherein said minimum number is adjustable.

20. The system according to claim 16, wherein said base station is arranged to transmit said minimum number in a message in common with said list of frequencies.

21. The system according to claim 16, wherein said base station transmits said minimum number and said list of frequencies in different respective messages.

22. The system according to claim 16, wherein said serving base station is arranged to change said minimum number during an on-going call by transmitting new minimum number information.

23. The system according to claim 16, wherein said base station transmits said minimum number in one system information message.

* * * * *